United States Patent
Poeluev et al.

(10) Patent No.: US 7,243,225 B2
(45) Date of Patent: Jul. 10, 2007

(54) DATA HANDLING IN IPSEC ENABLED NETWORK STACK

(75) Inventors: Yuri Poeluev, Mississauga (CA); Ronald G. Mercer, Mississauga (CA)

(73) Assignee: Certicom Corp., Mississauga (CA)

( * ) Notice: Subject to any disclaimer, the term of this patent is extended or adjusted under 35 U.S.C. 154(b) by 510 days.

(21) Appl. No.: 09/903,612

(22) Filed: Jul. 13, 2001

(65) Prior Publication Data

US 2003/0014626 A1 Jan. 16, 2003

(51) Int. Cl.
*H04L 9/00* (2006.01)
*G06F 17/00* (2006.01)
*H04N 7/167* (2006.01)

(52) U.S. Cl. ............... 713/151; 713/153; 713/160; 726/14; 726/15; 380/200

(58) Field of Classification Search .......... 380/200; 713/151, 160, 153; 726/14, 15
See application file for complete search history.

(56) References Cited

U.S. PATENT DOCUMENTS 6,438,612 B1 * 8/2002 Ylonen et al. .......... 709/249
6,708,218 B1 * 3/2004 Ellington et al. ........ 709/236
2002/0184487 A1 * 12/2002 Badamo et al. ......... 713/153
2004/0054794 A1 * 3/2004 Lantto et al. ........... 709/229

OTHER PUBLICATIONS

J. Postel. "Internet Protocol", RFC 791, Sep. 1, 1981, The Internet Society. http://www.ietf.org/rfc/rfc0791.txt?number=791 Sections 1-3.2.*
Kent, S. et al., "Security Architecture for the Internet Protocol," RFC 2401, Nov. 1998, The Internet Society.

* cited by examiner

*Primary Examiner*—Ayaz Sheikh
*Assistant Examiner*—Kaveh Abrishamkar
(74) *Attorney, Agent, or Firm*—John R.S. Orange; Brett J. Slaney; Blake, Cassels & Graydon LLP

(57) ABSTRACT

A method for providing cryptographic functions to data packets at the PPP layer of a network stack is presented. The method includes the steps of intercepting PPP datagrams having at least one encapsulated IP packet en route along the protocol stack; decapsulating the PPP datagrams to retrieve the encapsulated IP packet, determining whether to process the IP packet by modifying the IP packet to provide the cryptographic functions, and encapsulating the IP packet for transmission to a next layer of the network stack.

14 Claims, 5 Drawing Sheets

DATA HANDLING IN IPSEC ENABLED NETWORK STACK

FIELD OF THE INVENTION

The present invention relates to virtual private networks, more particularly it relates to the processing of data packets with a protocol stack.

BACKGROUND OF THE INVENTION

Over the last few years, the demand to provide networked communications has increased dramatically, and has resulted in enterprises of all sizes providing secure and reliable network access to mobile employees and telecommuters. As the costs of maintaining direct dial-up connections via modem pools and providing a private network infrastructure have grown substantially, a more cost-effective solution has been to use the Internet connections and virtual private network (VPN) servers. A VPN allows a remote client to connect to a corporate network by going directly through any public network, such as the Internet.

One of the technologies that facilitate a VPN is IP Security Architecture (IPSec), which offers an interoperable and open standard for building security into any Internet application. The primary services provided to the IP data packet by IPSec are data confidentiality and authentication. Confidentiality ensures that the data portion of the IP packet is unreadable by unauthorized entities, and the authentication service allows the recipient to be sure that the packet actually comes from the host identified by the source IP address. Both the authentication and confidentiality services are achieved through the use of cryptographic techniques.

The IPSec specification (found in RFC 2401) states that there are several ways to implement IPSec in a host or in conjunction with a router or firewall. The first method is to integrate IPSec into the native IP stack of the operating system the second method commonly referred to as "Bump in the Stack" (BITS) involves implementing IPSec "beneath" the IP stack and above the network drivers, while the third method known as "Bump in the Wire" (BITW) involves implementing IPSec in a hardware cryptographic processor.

The main advantage of integrating IPSec in the stack and BITS is that such a solution is considerably less expensive than BITW, as they are implemented in software. However, integrating IPSec in the stack requires the source code for the operating system to be available. If the source code is not available then the second method (BITS) is favored. The third method (BITW) is the most expensive implementation, as it requires additional hardware, although such specialized hardware implementations generally provide substantially higher performance in processing cryptographic functions.

However, on some operating systems, such as PALM® OS, it may not be feasible to intercept internet protocol (IP) packets at the network layer, due to the system architecture. Therefore, the methods described above may not be suitable to implement a driver at the network layer to perform operations on the IP packets.

It is therefore an object of this invention to mitigate at least one of these disadvantages.

SUMMARY OF THE INVENTION

In one of its aspects, the present invention provides a method for providing cryptographic functions to data packets at the data link layer of a network stack. The method includes the steps of intercepting point to point protocol (PPP) datagrams having at least one encapsulated IP packet en route along the protocol stack, decapsulating the PPP datagrams to retrieve the encapsulated IP packet, determining whether to process the IP packet by modifying the IP packet to provide the cryptographic functions, and encapsulating the IP packet for transmission to a next layer of the network stack.

BRIEF DESCRIPTION OF THE DRAWINGS

These and other features of the preferred embodiments of the invention will become apparent in the following defined description in which reference is made to the appended drawings wherein.

DESCRIPTION OF THE INVENTION

Figure 1:
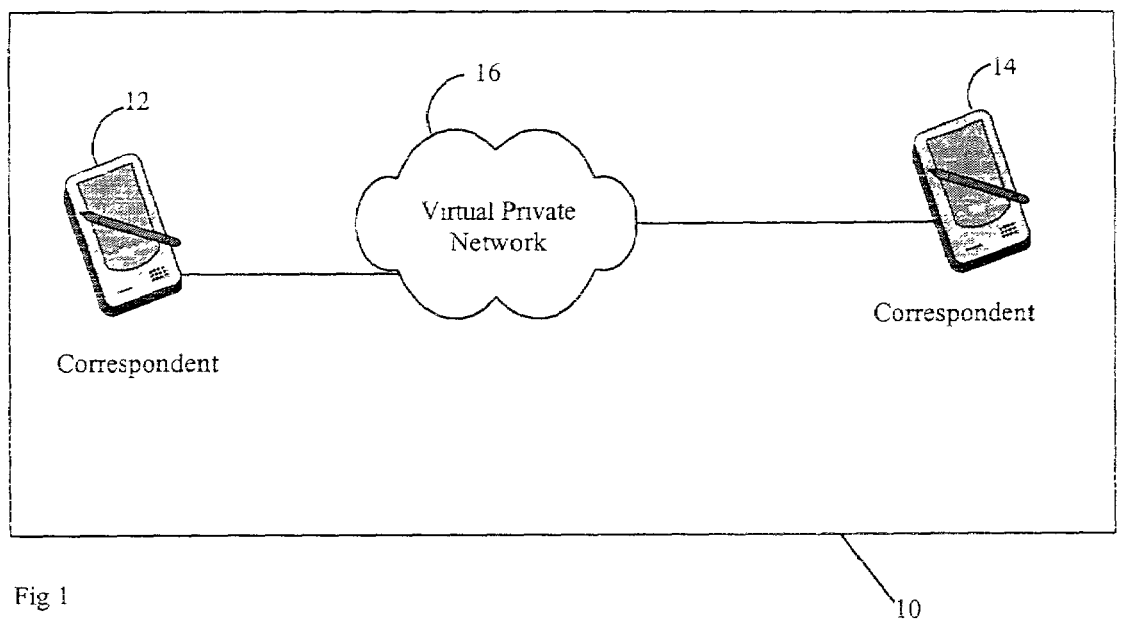
FIG. 1 shows overview of a system for facilitating a method for implementing security rules and policies within a protocol stack.

Reference is first made to FIG. 1, which is an overview of a system for facilitating a method for implementing security rules and policies within a protocol stack, shown generally by the numeral 10, in a preferred embodiment. The system 10 includes correspondents 12 and 14 communicatively coupled each other, via a communications network 16. It will be appreciated by persons skilled in the art that any network such as a local area network (LAN), a wide area network (WAN), the Internet or a wireless system using, for example, a wireless application protocol (WAP), may be used. The correspondents 12 and 14 are typically computing devices that are, but not limited to, personal computers, handheld devices, cell phones, pagers and microprocessor-based wireless information devices.

The correspondents 12 and 14 include a processing unit, computer readable medium including ROM, flash memory, non-volatile RAM, magnetic disk, optical disk, IC memory card or magnetic tape. Also, the correspondents 12 and 14 execute an operating system such as Microsoft® Windows 2000, Windows CE, UNIX, EPOC, Pocket® PC OS or Palm OS®.

Figure 2:
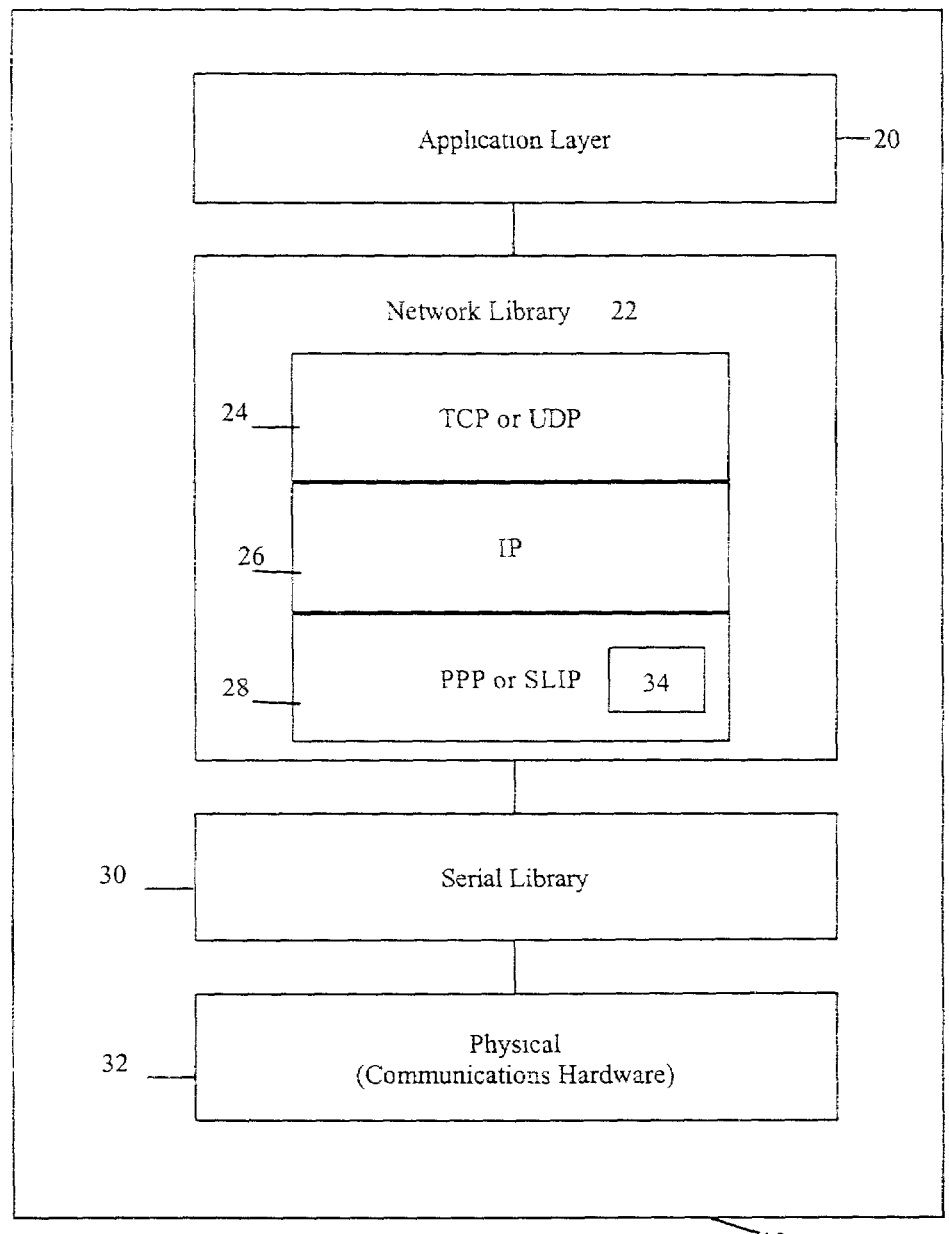
FIG. 2 shows a communication protocol stack for a handheld device operating system.

In the preferred embodiment, the correspondent 12 is a handheld device such as Palm or Handspring Visor executing the PALM OS operating system, from Palm Inc, California, U.S.A. Looking at FIG. 2, showing the network protocols in the PALM OS environment, the protocol stack 18 is based on the 7-layer OSI model. Thus the stack includes an applications layer 20 for applications such as web browsers and other application programs, a network library 22 coupled to the applications layer via a network library application programming interface (API). The network library 22 includes a transport (TCP and UDP) layer 24, a network (IP) layer 26 and a data link (PPP and SLIP) layer 28. These layers 24, 26 and 28 are integrated to substantially optimize performance, such as speed and space, especially in a handheld environment. Below the network library 22 is a serial library 30 coupled to network library 22 by a serial manager API and communicating with communication hardware 32 on the physical layer. The communication hardware 32 supports a number of communications protocols such as RS232 or X.21 for a serial port on cradle, USB port on cradle. The protocol stack 18 and the application programs may be stored in the computer readable medium or may be embedded in the computer readable medium.

Figure 3:
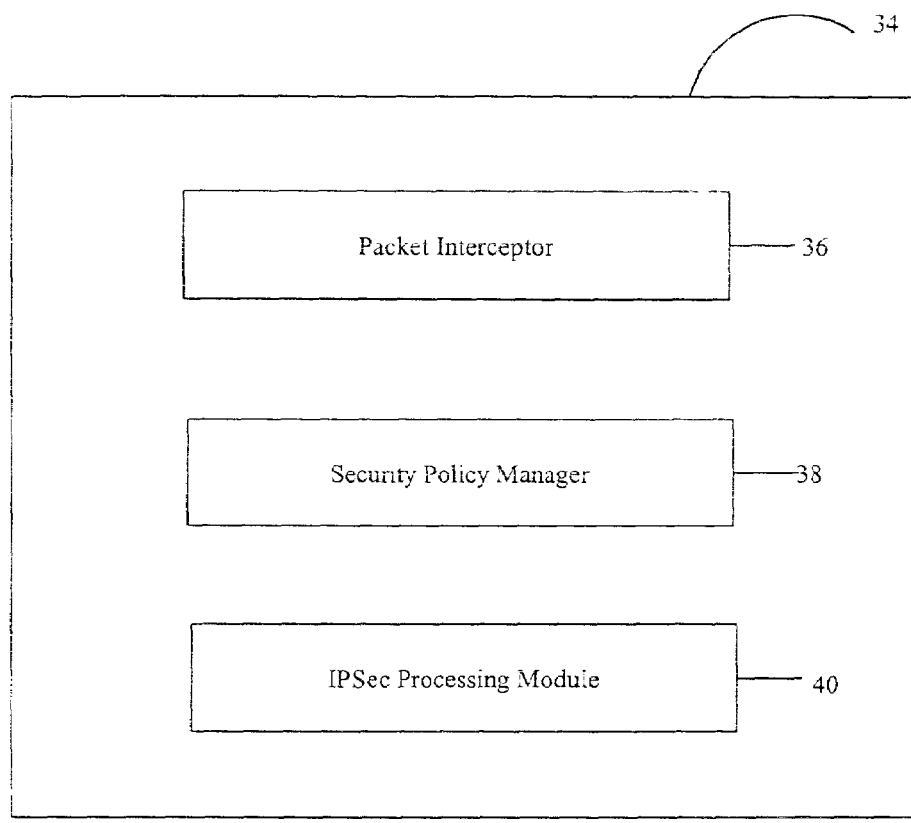
FIG. 3 shows a block diagram of an IPSec processing module.

Now referring to FIGS. 2 and 3, as mentioned above IPSec is usually implemented by adding security at the network layer (IP) and thus enabling security for data via public networks, such as the Internet, by setting up a virtual private network (VPN) IPsec uses an Authentication Header (AH) and an Encapsulating Security Payload (ESP) to apply security to IP packets. The AH and ESP headers include a Security Parameter Index (SPI). The SPI, along with the security protocol in use (AH or ESP) and destination IP address selectors, such as destination IP address or transport layer ports, combine to form the Security Association (SA).

At the sending correspondent 12, there is provided an IPSec security module 34 to implement security on the IP packet. The IPsec module 34 includes a packet interceptor 36 to intercept PPP datagrams and to decapsulate the PPP datagrams to retrieve the encapsulated IP packets. The packet interceptor 36 may be a software module such as a driver included in a kernal of the operating system in the computer readable medium of the system, placed below the PPP layer of a network stack. The IPsec module 34 determines the type of security to apply to the IP packets by referencing a security policy manager 38. The sending correspondent 12 determines what policy is appropriate for each IP packet, depending on various selectors (for example, destination IP address or transport layer ports), by looking in the security policy manager 38, which indicates the relevant policy for any particular packet. The packet either requires IPsec processing of some sort, in which case it is passed to an IPsec processing module 40 for processing; or it does not, in which case it is simply passed along for normal IP processing. The IPsec processing module 40 performs packet-per packet processing by examining the packets in order to select and apply cryptographic transformations on the IP packets as known the art. In instances where processing is not required, the IP packets may be dropped or the IP packets proceed up or down the protocol stack 18. Outbound packets are checked against the security policy manager 38 to see what kind (if any) of IPsec processing to apply, while inbound packets are checked against the security policy manager 38 to see what kind of IPsec service should be present in those IP packets.

After processing the IP packets are encapsulated to form a new PPP datagram, generally PPP uses the High-Level Data Link Control (HDLC) protocol as a basis for encapsulating datagrams and provides framing of packets transmitted over bit-oriented synchronous links. Also, the packet interceptor 36 monitors the Link Control Protocol (LCP) packets for ACCM parameters for HDLC framing for each direction. PPP uses LCP to establish, configure, and test the data-link connection, and network control protocols (NCP) for establishing and configuring different network-layer protocols.

Figure 4:
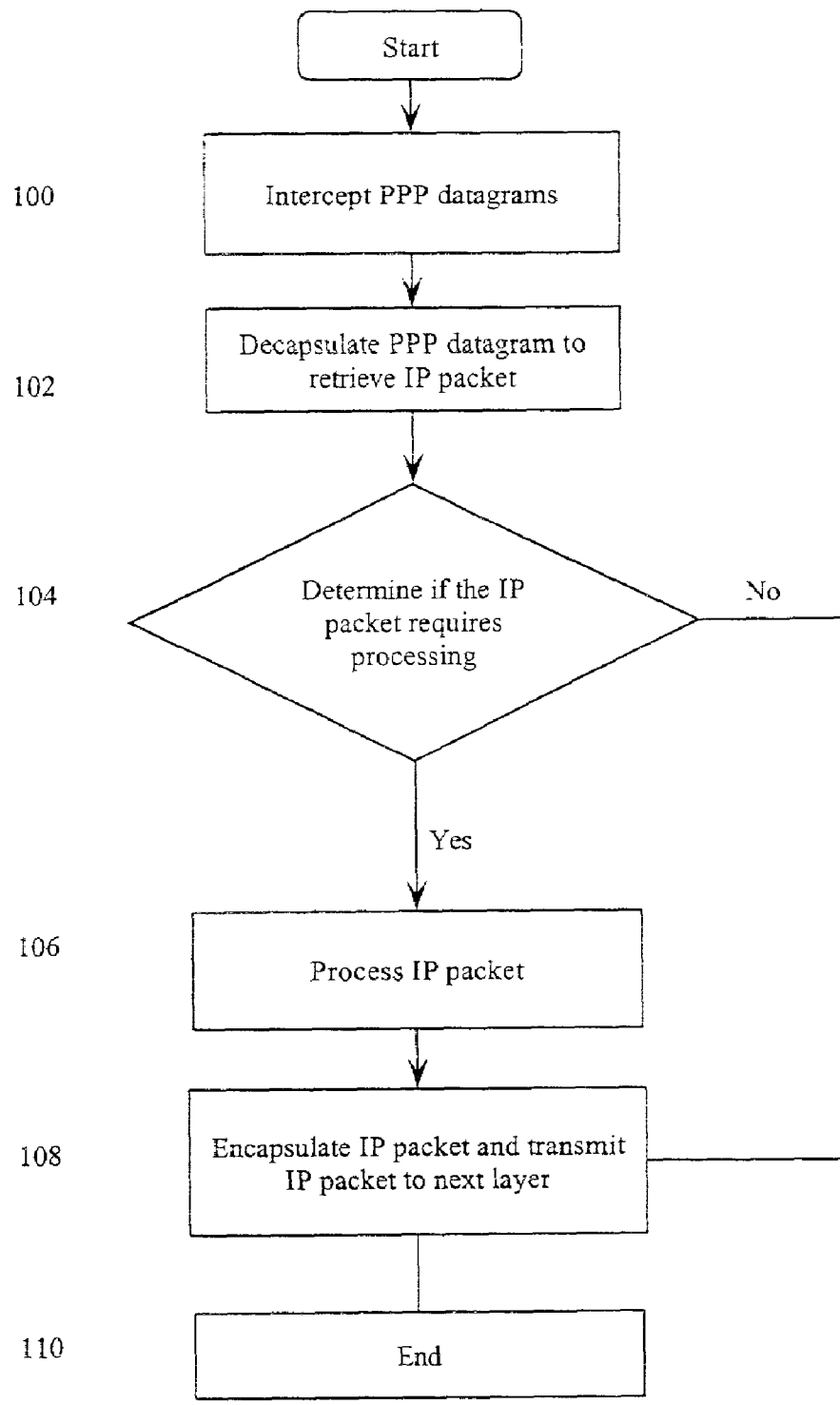
FIG. 4 shows a flow diagram outlining the steps for intercepting a PPP packet and the steps for modifying the IP packet.
Figure 5:
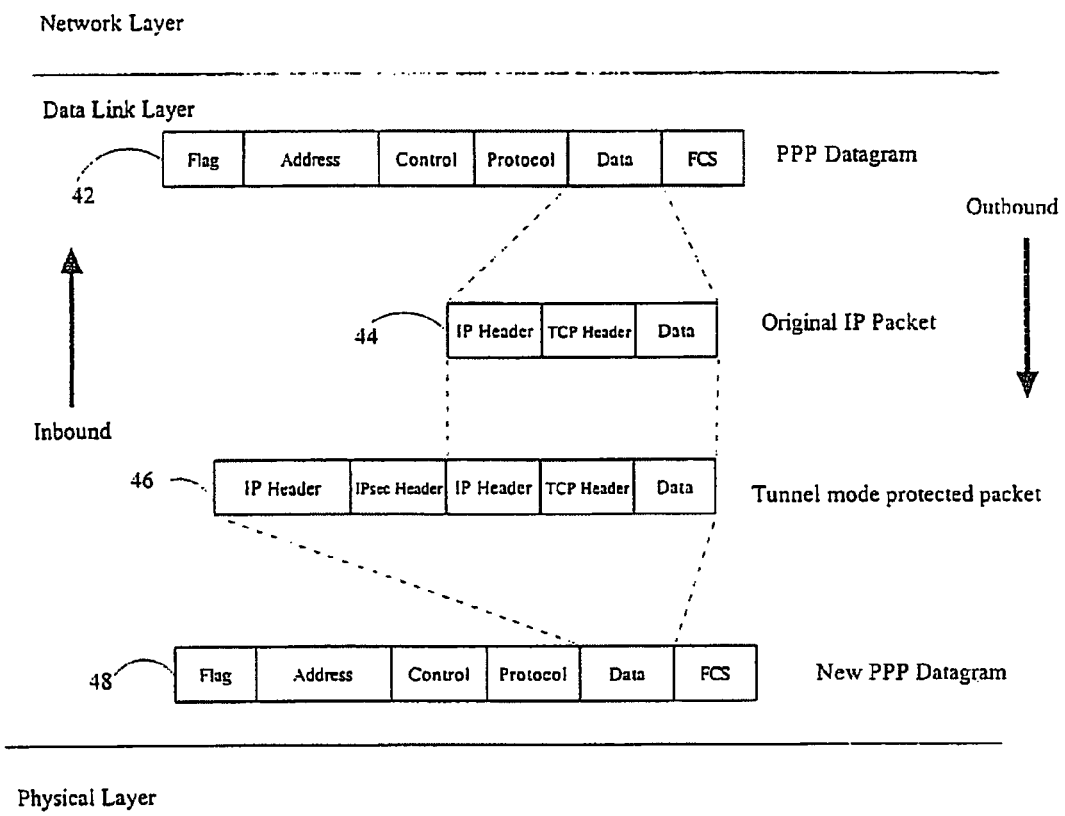
FIG. 5 shows operations performed on the data packet at each step of the flow diagram of FIG. 4.

The process for applying cryptographic functions to IP packets at the PPP layer of a network stack is illustrated by a flow chart of FIG. 4, in conjunction with FIG. 5. The PPP datagram 42 includes the following frame fields: a flag field which indicates the beginning or end of a frame and consists of the binary sequence, an address field, a control field, a protocol field to identify the protocol encapsulated in the data field of the frame, a data field that contains the datagram for the protocol specified in the protocol field and a frame check sequence (FCS) for error detection. The process starts with step 100 where a byte stream in the form of a plurality of PPP datagrams 42 is intercepted en route along the protocol stack 18. In step 102, the PPP datagram 42 is decapsulated to retrieve the encapsulated IP packet 44, and then a determination 104 is performed as to how the IP packet 44 should be processed. Should the IP packet 44 require processing, it is transformed by adding cryptographic functions to the IP packets 44 in step 106 resulting in a tunnel mode protected packet or a transport mode protected packet 46, or else the IP packet 44 is not processed 108. In step 110, the IP packet is encapsulated with a PPP header and trailer and a new PPP datagram 48 and the modified IP packet is thus formed and transmitted to the physical interface.

Since encapsulation results in the original IP packet 44 being hidden or included inside a PPP datagram 48, the IP header of the tunnel mode protected packet 46 provides the necessary routing information, enabling the packet 44 to travel through the communication network 12 without revealing the final destination stored in the original IP packet header. Once the encapsulated IP packets 44 reach their destination, the encapsulation header is removed and the original IP packet header is used to route the packet to its final destination.

The above-described embodiments of the invention are intended to be examples of the present invention and alterations and modifications may be effected thereto, by those of skill in the art, without departing from the scope of the invention which is defined solely by the claims appended hereto.

The invention claimed is:

1. A method for providing cryptographic functions to data packets below the network layer of a network stack and hidden from said network layer, the method including the steps of:
   intercepting in the data link layer of said network stack, datagrams outbound to and inbound from said network layer, said datagrams being encapsulated by a header and a footer associated with said data link layer and having at least one encapsulated data packet;
   decapsulating said datagrams by removing said header and said footer to retrieve said at least one encapsulated data packet;
   examining said at least one encapsulated data packet to determine whether to process said at least one encapsulated data packet using said cryptographic functions by referencing a security policy comprising one or more processing rules and selecting at least one processing rule for said at least one encapsulated data packet according to said security policy;
   if said at least one encapsulated data packet requires processing, modifying said at least one encapsulated data packet to provide said cryptographic functions;
   preparing reconstructed datagrams by re-encapsulating said at least one encapsulated data packet with said header and said footer; and
   providing said reconstructed datagrams back to said data link layer for continued transmission along said network stack.

2. The method of claim 1 wherein said data packet is an IP packet having a header, an address and data.

3. The method of claim 1 wherein said step of modifying said data packet includes the further step of selecting an IPSec protocol.

4. The method of claim 1 wherein the step of examining said at least one encapsulated data packet includes checking header information.

5. A method according to claim 1 wherein said datagrams are PPP datagrams.

6. A method according to claim 1, said at least one encapsulated data packet being an IP data packet.

7. A method according to claim 1 wherein said modifying comprises IPSec tunneling.

8. A method according to claim 1 wherein said referencing comprises reviewing a predetermined set of selectors being one or more of a destination IP address and a transport layer port.

9. A system for processing data packets for secure communications between correspondents of said system by providing cryptographic functions to data packets below the network layer of a network stack and hidden from said network layer, said system having:
- a packet interceptor in the data link layer of said network stack for intercepting datagrams outbound to and inbound from the network layer, said datagrams being encapsulated by a header and a footer associated with said data link layer and having at least one encapsulated data packet, said packet interceptor for decapsulating said datagrams by removing said header and said footer to retrieve said at least one encapsulated data packet, and said packet interceptor for preparine reconstructed datagrams by re-encapsulating said at least one data packet with said header and said footer and for providing said reconstructed datagrams back to said data link layer for continued transmission alone said network stack;
- a security policy manager including at least one security policy storing processing rules for said data packets and for selecting at least one of said processing rules for said at least one encapsulated data packet according to said security policy; and
- a processing module for examining said at least one encapsulated data packet decapsulated by said packet interceptor, and if said at least one encapsulated data packet requires processing, modifying said at least one encapsulated data packet by selecting and applying said cryptographic functions thereto, said processing module being in communication with said security policy manager;
- wherein said datagrams are intercepted and examined in accordance with said processing rules.

10. The system of claim 9, wherein the packet interceptor is a software module.

11. The system of claim 10, wherein said software module is a driver included in a kernel of an operating system in computer readable medium of said system.

12. The system of claim 9, wherein the cryptographic functions are implemented using an IPsec protocol by said processing module.

13. The system of claim 9, wherein said secure communications between correspondents of said system are provided via a virtual private network.

14. A method for providing a cryptographic system for communication between correspondents in a communication network to data packets below the network layer of a network stack and hidden from said network layer, said method comprising the steps of
- providing in the data link layer, a security module in a computer readable medium at each of said respondents, said security module having:
  - a packet interceptor for intercepting datagrams outbound to and inbound from the network layer, said datagrams being encapsulated by a header and a footer associated with said data link layer and having at least one encapsulated data packet, said packet interceptor for decapsulating said datagrams by removing said header and said footer to retrieve said at least one encapsulated data packet, and said packet interceptor for preparing reconstructed datagrams by re-encapsulating said at least one data packet with said header and said footer and for providing said reconstructed datagrams back to said data link layer for continued transmission along said network stack;
  - a security policy manager including at least one security policy storing processing rules for said data packets and for selecting at least one processing rule for said encapsulated data packet according to said security policy; and
  - a processing module for examining said at least one encapsulated data packet decapsulated by said packet interceptor, and if said at least one encapsulated data packet requires processing, modifying said at least one encapsulated data packet by selecting and applying cryptographic functions thereto, said processing module being in communication with said security policy manager;
- examining in said data link layer said data packets decapsulated by said packet interceptor outbound to said network layer to determine whether processing by said processing module is required; and
- examining in said data link layer, said data packets decapsulated by said packet interceptor inbound from said network layer to determine whether processing by said processing module is required by checking whether said data packets include cryptographic functions.

* * * * *